Figure 1:
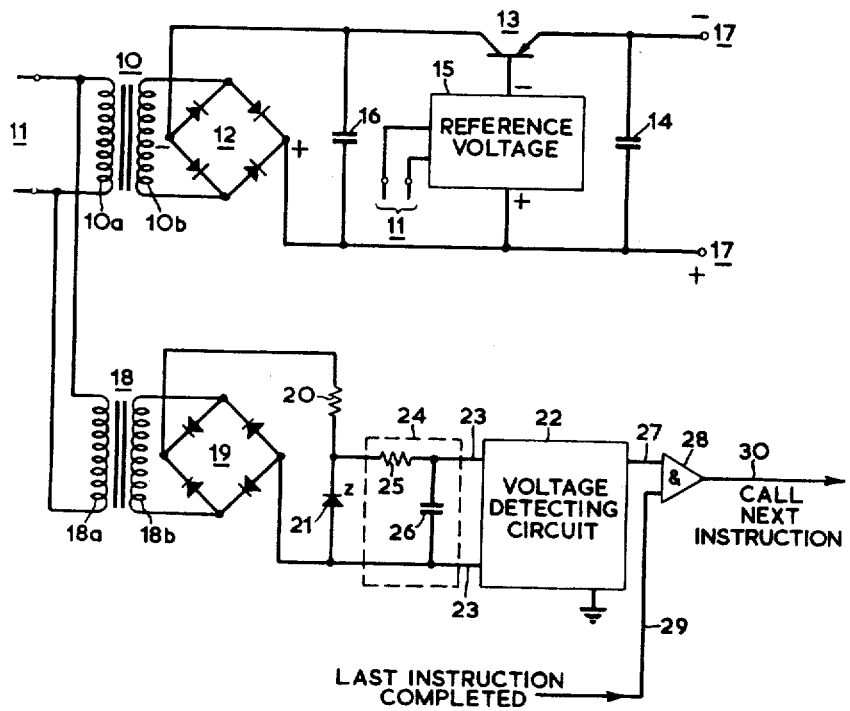

June 8, 1965  A. ASBURY  3,188,452
SUPPLY AND CONTROL MEANS FOR AN ELECTRIC DIGITAL COMPUTER
Filed Sept. 7, 1962

United States Patent Office 3,188,452
Patented June 8, 1965

3,188,452
SUPPLY AND CONTROL MEANS FOR AN
ELECTRIC DIGITAL COMPUTER
Allan Asbury, Stoke-on-Trent, England, assignor to The
English Electric Company Limited, Strand, London,
England, a British company
Filed Sept. 7, 1962, Ser. No. 222,071
Claims priority, application Great Britain, Sept. 13, 1961,
32,845/61
5 Claims. (Cl. 235—151)

This invention relates to an electric supply means for an electric digital computer, and to an associated computer control means for influencing the behaviour of the computer on the occurrence of a failure of a power source from which the computer derives its electrical energisation.

According to the present invention an electric supply and control means for an electric digital computer comprises electrical storage means having an energy storing capacity which is matched to the average energy requirements of an associated computer, direct current supply means connectible with an energy supply source for maintaining the storage means charged with electrical energy substantially at a desired level, control means responsive to a failure of the energy supply source for producing, on such a failure, a control signal for influencing the computer so as to cause the computer to be brought to a predetermined condition in which a subsequent loss of an adequate supply of electrical energy from the storage means will be of no substantial detriment to the computer, or to information stored or being processed therein at the time of detecting the failure of the energy supply source.

According to another feature of the present invention the supply means is arranged for connection with an A.C. supply source, and the control means comprises a rectifying means for supplying direct current, from the A.C. supply source, to a non-linear voltage dividing circuit which includes in series relationship a ballast impedance and a constant voltage device, the latter being arranged to saturate at a predetermined voltage slightly greater than the minimum instantaneous value of the unsmoothed output voltage wave of the rectifying means, and a detecting means having an input circuit connected through a smoothing means in parallel with the constant voltage device, the detecting means being operative to produce a substantial change in an output signal appearing at an output circuit thereof whenever the voltage applied to its input circuit falls below a predetermined supply failure indicating value which is less than the saturation voltage of the constant voltage device but greater than the said minimum instantaneous value, and the smoothing means being effective to prevent the voltage applied to the input circuit of the detecting means falling to the predetermined supply failure indicating value when the A.C. supply voltage is within its normal range of operating values.

In one arrangement in which the A.C. supply source is a single phase source, the rectifying means being a full-wave single phase rectifying means, the constant voltage device is arranged to have a saturation value of approximately 1/10 of the amplitude of the output voltage of the rectifying means, the said minimum instantaneous value being zero value.

Preferably the constant voltage device comprises a zener diode.

According to another feature of the invention the supply and control means includes a regulating means for automatically regulating the flow of current from the storage means to an output circuit connectible with the computer in dependence upon the excess of a reference voltage provided by a reference voltage source over an output voltage developed at the output circuit and in a manner such as to maintain the output voltage substantially constant at a value dependent upon the magnitude of the reference voltage.

Figure 2:
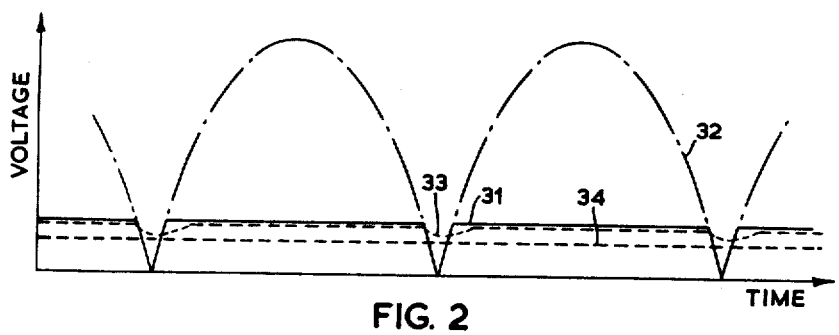

One electric supply and control means for an electric digital computer will now be described by way of example and with reference to the accompanying drawing, in which FIG. 1 shows a diagram of the relevant circuit connections of the supply and control means, and FIG. 2 shows a diagram of the manner in which the voltages appearing at certain parts of the circuit vary with time.

Referring now to the drawing, a supply transformer 10 has a primary winding 10a connected to an A.C. supply source 11, and a secondary winding 10b connected to the A.C. input circuit of a bridge-type rectifier network 12. The D.C. output circuit of the latter is connected through the collector-emitter circuit of a p-n-p type transistor 13 to a storage capacitor 14 of relatively large capacity, the collector of the transistor being connected to the negative terminal of the rectifier network 12 and the emitter of the transistor being connected to the negative terminal of the storage capacitor. The base of the transistor 13 is connected to the negative output terminal of a reference voltage source 15 whose positive output terminal is connected to the positive terminal of the rectifier network 12. Thus the collector-base potential of the transistor is determined by the excess of the output voltage of the rectifier network 12 over the reference voltage of the source 15, and the emitter-base potential is determined by the excess of the reference voltage of the source 15 over the output voltage developed across the capacitor 14.

The reference source 15 is supplied from the A.C. supply source 11 and comprises a circuit arrangement having a time constant (for example one-third of a second) which is large in comparison to small increments of computer time. This circuit arrangement provides a substantially constant D.C. reference voltage between its positive and negative output terminals, and incorporates a neon voltage reference tube across which the reference voltage is developed, and which is connected through a resistor of high resistance value across a neon stabilising tube. The latter is in turn connected across an output smoothing circuit which is supplied by a full-wave rectifying network energised from the A.C. supply source.

A capacitor 16 of approximately four times the capacity of the storage capacitor 14 is connected across the D.C. output terminal of the rectifier network 12 for smoothing the output voltage produced by this network and for providing ample energy storage capacity for satisfying the average energy demand of a computer to be supplied by this supply and control means.

The D.C. output voltage for the computer is developed at output terminals 17 connected to the terminals of the storage capacity 14. The output voltage appearing at these terminals 17 is dependent on the charge stored in the capacitor 14, and this charge is maintained automatically at a predetermined level by conduction of the regulating transistor 13 when the output voltage developed across the capacitor 14 falls below the reference voltage. The rectifier network 12 is arranged to produce an average output voltage which is substantially greater than the reference voltage of the source 15.

Since in operation the transistor 13 can conduct current through its collector-base circuit only when the base is at a negative potential relative to that of the emitter (the impedance to such current conduction being otherwise high), the transistor 13 will tend to absorb any variations in the voltage appearing between its collector and base as a result of variations in the output voltage of the rectifier network 12 when the capacitor 14 is charged up to the reference voltage. Hence the transistor 13 operates in a manner such as to tend to prevent variations in the A.C. supply voltage of the source 11 being transmitted through to the capacitor 14 and output terminals 17.

The storage capacitor 14 is of large capacity sufficient to enable it to supply under normal A.C. supply conditions any demand for steep-fronted pulses made by the computer (as for example when transferring data to or from a core store) without reducing the output voltage at the output terminals 17 by any appreciable amount. These pulses cannot be supplied from the capacitor 16 through the regulating transistor 13 because of the relatively high time constant of the transistor 13, this time constant being of the order of a few milliseconds. The storage capacity of the capacitor 14 on the other hand is such as to maintain the D.C. supply voltage supplied to the terminals 17 and associated computer substantially at the norminal value for an appreciable period of computer time should the A.C. supply be interrupted temporarily when the computer is in operation.

If the A.C. supply voltage falls, and remains for any appreciable time, below the value enabling the D.C. output voltage for the computer to be maintained substantially at its nominal value, it is desirable that some control means should be rendered operative to allow further operation of the computer using energy stored in the capacitor 16 and then to stop the computer at some convenient and easily determined stage in its sequence of operation before the D.C. output voltage at the terminals 17 falls to a critical value at which the computer ceases to function properly. Otherwise, the D.C. output voltage at the terminals 17 may fall below this critical value during a read-write cycle for a core store with a consequent loss of information, or at some indeterminate stage in an arithmetic operation. The following circuit arrangement is intended to provide such a facility.

A further supply transformer 18 has a primary winding 18a connected to the A.C. supply suorce 11 and a secondary winding 18b connected to the A.C. input circuit of a further bridge type rectifier network 19. The D.C. circuit of the latter network supplies a nonlinear voltage dividing circuit which includes in series relation a ballast resistor 20 and a zener diode 21.

A voltage detecting device 22 has an input circuit 23 which is connected through a smoothing filter 24 across the zener diode, the filter circuit 24 including a resistor 25 and a capacitor 26. The detecting device 22 is arranged to produce an output signal at an output circuit 27 only so long as the voltage supplied to its input circuit 23 exceeds a predetermined low value.

An AND gate 28 is responsive to the voltages appearing at the output circuit 27 and at a computer interlocking circuit 29, and provides a signal at its output circuit 30 only when the requisite voltage signals appear simultaneously at its two input circuits.

The zener diode 21 is arranged to develop when saturated a zener voltage equal to approximately one tenth of the amplitude of the rectified A.C. voltage supplied by the rectifier network 19. The voltage thus appearing across the zener diode under normal supply voltage conditions varies with time as shown in FIG. 2 by the full-line curve 31, the rectified voltage produced by the rectifier network 19 being shown by the chain-dotted line 32. The corresponding voltage supplied to the input circuit 23 of the voltage detecting device 22 varies in the manner shown by the curve 33 in FIG. 2, and the voltage below which the detecting device 22 ceases to produce an output voltage signal at its output circuit 27 is shown by the dotted line 34 in FIG. 2.

A voltage signal appears at the computer interlocking circuit 29 only on completion of the last instruction given to the computer, this signal being cancelled automatically by the computer on receipt of the next instruction.

The output voltage signal produced by the AND gate at its output circuit 30 passes to the computer to call up the next instruction for the computer.

Providing that the normal A.C. supply voltage is present at the source 11 the voltage applied to the input circuit 23 of the detecting device 22 remains always above the predetermined level indicated at 34, so that an output signal is present continuously at the output circuit 27. Thus each time an "instruction completed" signal appears at the interlocking circuit 29, a signal is passed by the AND gate so as to call up the next instruction or group of instructions for the computer.

However, if the A.C. supply fails, or its voltage falls to some value insufficient to maintain the computer operating in its normal manner, the voltage developed across the zener diode falls below the level indicated at 34, and the voltage detecting device 22 thereupon ceases to produce an output signal at its output circuit 27. Hence when the next "instruction completed" signal appears at the interlocking circuit 29, no signal is passed by the AND gate to the computer, so that the computer is rendered inoperative.

Warning means responsive to the lack of an output signal at the circuit 27 may be provided to warn the operators of the computer that the A.C. supply has failed and that the computer will cease operating after the completion of the instruction at the moment being carried out.

The failure of the A.C. supply is detected by the apparatus within a few milliseconds of its occurrence thus enabling the computer to cease operation at a convenient and known state, without appreciable delay, and without the loss of information or data.

Any other form of constant potential device may be used in the place of the zener diode, as for example a neon device.

Furthermore, the transistor 13 may be replaced by any other equivalent variable impedance device, as for example, by an electronic valve or by a silicon-controlled rectifier.

Means may also be provided for causing the computer to put into effect some predetermined emergency programme on detection of a failure in the A.C. supply source by the device 22 whereby to put the computer into a predetermined known state with all information returned to the permanent storage devices of the computer. Thus, when after the detection of such a failure the voltage across the storage capacitor 14 falls below the necessary minimum operating value, the computer and the information temporarily stored in or being processed by the computer at the instant of such faliure suffers no detrimental effects. Thus no data is lost and the computer is left in a known condition ready for further operation when the A.C. supply source is restored to normal operation.

Though in the above embodiment the full-wave rectifier networks 12 and 19 are fed from a single phase A.C. supply, they could be replaced by polyphase fullwave rectifiers for supply from an appropriate polyphase A.C. supply source. The conditions in the circuit would then be represented by the curves shown in FIG. 2 if the voltage scale is extended downwardly below the horizontal time axis shown there so as to represent the true voltage scale. In such a modified FIG. 2 the chain dotted curve 32 represents the full-wave rectified A.C. voltage, the full line curve 31 represents the voltage developed across the zener diode 21, the dotted curve 33 represents the input voltage applied to the voltage detecting circuit 22, and the dotted line 34 represents the voltage necessary at the input circuit 23 of the voltage detecting circuit for it to produce an output voltage signal at the output circuit 27.

What I claim as my invention and desire to secure by Letters Patent is:

1. Supply apparatus for an electric digital computer including a "supply" rectifying means having input alternating current connections and output direct current connections, means for connecting the input connections with an alternating current supply source, means for connecting the output connections with an electric digital computer whereby to supply it with electrical energy derived from the alternating current supply source, an electric storage capacitor connected between the output connections and having an energy storage capacity which under normal conditions of the supply source is sufficient at least to enable the computer to carry out, if initiated, a predetermined "supply-failure" emergency action, "supply-failure" detecting means for supplying to the computer on failure of the supply source a control signal whereby to initiate the computer to cause it to carry out the predetermined supply-failure emergency action, and means for connecting the supply-failure detecting means to the said input alternating current connections, the computer being brought by such emergency action to a predetermined condition prior to the loss of an adequate supply of electrical energy from the storage capacitor consequent upon a failure of the supply source, in which condition such loss of an adequate supply is of no substantial detriment to the computer and to information in the computer at the time of detecting a supply failure.

2. Supply apparatus according to claim 1, wherein the supply-failure detecting means comprises a non-linear potential dividing circuit including in series with one another a constant-impedance ballast device and a constant-potential device, a "control" rectifying means having input alternating current connections and output direct current connections, means for connecting these last-mentioned input connections with the said supply source, means for connecting these last-mentioned output connections with the non-linear potential dividing circuit so as to pass therethrough a current dependent on the potential of the supply source, a potential detecting means for producing at an output circuit thereof the said control signal, and means including smoothing means for connecting the potential detecting means in parallel with the constant-potential device, the saturation potential of the constant-potential device being slightly greater than the minimum instantaneous value of the output potential wave developed at the output connections of the control rectifying means, the potential detecting means being operative to produce the said control signal whenever the potential developed across the constant-potential device falls below a predetermined "supply-failure" indicating value which is less than the saturation potential of the constant-potential device but greater than the said minimum instantaneous value, and the said smoothing means being arranged to prevent the potential applied to the potential detecting means falling to the supply-failure indicating value when the alternating current supply source potential is within its normal range of operating values.

3. Supply apparatus according to claim 2, wherein the control rectifying means is a full-wave single phase rectifying means, and the constant-potential device comprises a zener diode having a saturation potential of approximately one tenth of the amplitude of the output potential of the control rectifying means.

4. Supply apparatus according to claim 3, wherein the potential detecting means comprises means for producing an output potential whenever the potential developed across the constant-potential device exceeds the supply-failure indicating value, and substantially no output potential when the said potential falls below the supply-failure indicating value, the change in output potential on failure of the power supply constituting the said control signal, and including AND gating means responsive to the said control signal and to "instruction-completed" signals provided by the computer for indicating that a last instruction has been completed for preventing the computer carrying out further instructions except in the simultaneous absence of such a control signal and presence of an "instruction-completed" signal.

5. Supply apparatus according to claim 1, wherein the means for connecting the output connections of the supply rectifying means to an electric digital computer includes a second storage capacitor for connection in parallel with the computer, a variable impedance means for regulating the flow of energy from the supply rectifying means to the second storage capacitor and the computer, a reference potential means for producing a reference potential, closed-loop control means for controlling the impedance of the variable impedance means in dependence upon the excess of the reference potential over an output potential developed across the second storage capacitor in a manner tending to maintain the output potential in accordance with the reference potential.

References Cited by the Examiner

UNITED STATES PATENTS 3,029,414  4/62  Schrimpf _____ 235—172.5

MALCOLM A. MORRISON, *Primary Examiner.*